J. S. & T. B. ATTERBURY,

Assignors to Dithridge & Co.

METHOD OF MAKING SMOKE BELLS.

No. 7,747. Reissued June 19, 1877.

WITNESSES.

L. C. Fitter

J. K. Smith

INVENTOR.

James S. Atterbury

Thomas B. Atterbury by Bakewell & Kerr

Attorneys

UNITED STATES PATENT OFFICE.

JAMES S. ATTERBURY AND THOMAS B. ATTERBURY, OF PITTSBURG, PENNSYLVANIA, ASSIGNORS TO DITHRIDGE & CO., OF SAME PLACE.

IMPROVEMENT IN METHODS OF MAKING SMOKE-BELLS.

Specification forming part of Letters Patent No. 57,063, dated August 14, 1866; reissue No. 6,886, dated February 1, 1876; reissue No. 7,747, dated June 19, 1877; application filed March 30, 1877.

*To all whom it may concern:*

Be it known that we, JAMES S. ATTERBURY and THOMAS B. ATTERBURY, of Pittsburg, in the county of Allegheny and State of Pennsylvania, have invented a new and useful Improvement in Methods of Making Smoke-Bells, &c.; and we do hereby declare the following to be a full, clear, and exact description thereof, reference being had to the accompanying drawing, making a part of this specification, in which—

Figure 1:
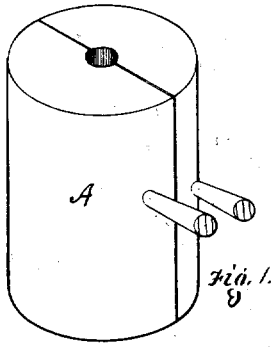
Figure 2:
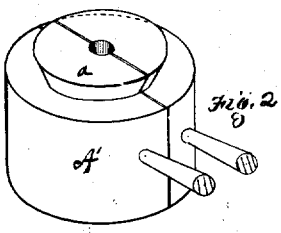
Figure 3:
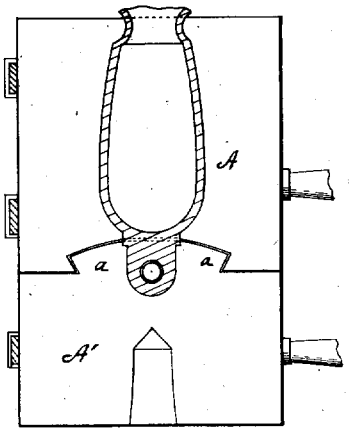
Figure 4:
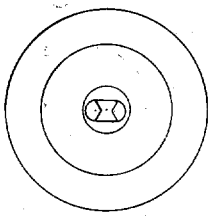
Figure 5:
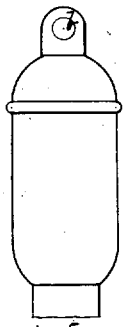
Figure 6:
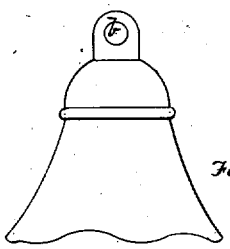
Figure 7:
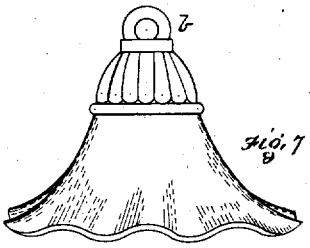
Figure 8:
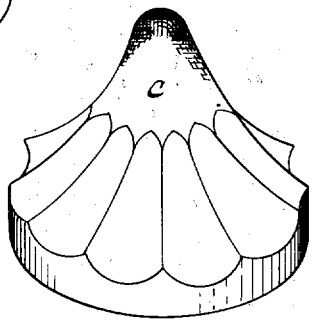
Figure 9:
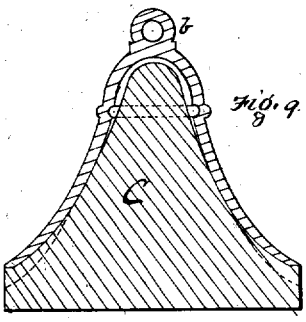

Figure 1 is a perspective view of the upper part of the divided mold. Fig. 2 is a perspective view of the lower half of the mold. Fig. 3 is a view of one-half of the two molds put together, showing the form of the glass bell when molded in the same. Fig. 4 is a top view of the lower portion of the mold. Fig. 5 shows the form of the molded glass preparatory to shaping the lower end. Fig. 6 is a side view of a smoke-bell. Fig. 7 is a perspective view of a bell after it has been flared and finished on the fluting-former. Fig. 8 is a perspective view of a coniform former by which the bell is flared and crimped or fluted at its open end. Fig. 9, by a vertical section, illustrates the last-mentioned operation, the bell being shown on the former, the section being through the projecting edges.

Prior to our invention glass articles were always flared by means of a hand-tool moved around along the inner edges of the open end. This method is open to the objection of being entirely dependent upon the still of the workman in securing symmetry and uniformity in the product. This lack of symmetry in the article is observable even after it has been flared and crimped, and is very objectionable.

Our invention removes the tool from the hands of the workman, and by supplying a fixed invariable pattern not only gives symmetry in the article, but uniformity to the entire product. By "flaring" we mean "belling" or opening out the sides beyond lines parallel to the axis, in such a way that the thickness of the sides is not materially changed—that is, not more than is necessary to give the article a greater diameter at the end—by the simple stretch of the glass, its quantity or bulk not being increased at that point.

Our invention consists, first, in forming the eye or loop by which the smoke-bell is suspended and handled by means of projections extending from the sides of the divided mold, so as to meet when it is closed; second, in enlarging or flaring the open end of a previously-formed glass article, without external pressure, by means of a coniform or tapering former placed in a suitable position, over or upon which it is pressed while the glass at the end to be placed is in a plastic condition; third, in crimping or fluting the open end of a previously-formed hollow glass article by means of a coniform or tapered former, placed in a suitable position and having radially-projecting ribs or edges; fourth, in the tapered plug or former for opening and shaping the end of hollow glass articles.

We will now describe the operation.

A A′ are ordinary two-part molds, united by the ordinary dovetail joint *a*. The cavity of the mold is such as to produce the smoke-bell required, one end of which is open and of cylindrical form. (See Fig. 5.) The lower section is provided with two projections, *c*, one on each half, which, when the mold is closed, meet centrally.

When the article is blown the loop or eye is made. The opening of the mold A′ withdraws the projections and frees the article, so that it can be taken out. The glass, having been blown and removed from the mold, is reheated at the end to be flared or opened. It is then opened or flared by pressing it over the coniform or tapered former C, which, not being a hand-tool, is placed in such a position that the glass may be pressed over or upon it. The edges or projecting ribs thereof communicate the fluted form to the plastic glass when the latter is pressed against them, as shown in Fig. 9.

It is evident that the end *e* of the previously-made article *d*, when reheated to the soft or plastic condition in which glass is worked in finishing operations, and pressed over the tapered plug or former C, will be opened out by the same without requiring the exercise of the skilled and expensive hand-labor necessary prior to our invention for opening and flaring smoke-bells and similar articles, and that, the flare communicated to the article being the counterpart of the former, there will be a uniformity of shape in the product of the same. The flare or bell of the article being uniform, the flutes formed therein will share the same uniformity, so that by this method we can produce a highly and uniformly finished, as well as a very beautiful, article without the aid of skilled labor, and consequently reduce the cost of production.

It is apparent that the principle of this part of our invention consists in the uniform and unhampered stretch of the plastic glass on all sides, such being possible by the use of a tapered or coniform plug or former placed in a suitable position, and the absence of external pressure. It is a fact well known to glass-manufacturers that in the finishing of hollow articles having thin sides, when being operated upon internally by a rigid or hard tool, external contact with hard or metallic forming or pressing devices is not only injurious, but in most cases destructive to the article.

What we claim as our invention, and desire to secure by Letters Patent, is—

1. The method herein described of forming the eye or loop of the smoke-bell by projections on the inside of the mold, which, when the latter is closed, extend across the forming cavity.

2. The method of flaring glass smoke-bells and other glass articles without external pressure by reheating the end to be flared and pressing it over a tapering or coniform former, substantially as described.

3. The method of crimping or fluting smoke-bells and other glass articles by reheating the end of the article and pressing it over a tapered or coniform former having radially-projecting edges, substantially as described.

4. A tapered or coniform plug or former for flaring and shaping the open end of smoke-bells and other articles, substantially as described.

In witness whereof we, the said JAMES S. ATTERBURY and THOMAS B. ATTERBURY, have hereunto set our hands.

J. S. ATTERBURY.
THOS. B. ATTERBURY.

Witnesses:

DANIEL WENKE, Jr.,
F. METZ.